United States Patent
Benafan et al.

(10) Patent No.: US 11,174,850 B1
(45) Date of Patent: Nov. 16, 2021

(54) SHAPE MEMORY ALLOY NESTED ROTARY ACTUATOR

(71) Applicant: United States of America as represented by the Administrator of NASA, Washington, DC (US)

(72) Inventors: Othmane Benafan, Middleburg Heights, OH (US); Phillip B. Abel, Cleveland, OH (US); Steven W. Bauman, Cleveland, OH (US); Darrell J. Gaydosh, Cleveland, OH (US); Paul A. Solano, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 16/751,749

(22) Filed: Jan. 24, 2020

Related U.S. Application Data

(60) Provisional application No. 62/797,727, filed on Jan. 28, 2019.

(51) Int. Cl.
*F03G 7/06* (2006.01)
*F16H 35/00* (2006.01)

(52) U.S. Cl.
CPC ............ *F03G 7/065* (2013.01); *F16H 35/00* (2013.01)

(58) Field of Classification Search
CPC ................................ F03G 7/065; F16H 35/00

USPC ................................................... 60/527–529
See application file for complete search history.

(56) References Cited

U.S. PATENT DOCUMENTS

| | | | |
|---|---|---|---|
| 5,127,228 A | 7/1992 | Swenson | |
| 5,975,468 A * | 11/1999 | Moignier | F03G 7/065 244/172.7 |
| 6,065,934 A | 5/2000 | Jacot et al. | |
| 6,499,952 B1 * | 12/2002 | Jacot | F03G 7/065 416/155 |
| 7,159,398 B1 | 1/2007 | Bushnell et al. | |
| 8,127,543 B2 * | 3/2012 | Behrens | F03G 7/065 60/527 |
| 8,726,652 B1 | 5/2014 | Gunter | |
| 9,885,345 B2 | 2/2018 | Calkins et al. | |

OTHER PUBLICATIONS

O. Benafan and D.J. Gaydosh, Scale-up of NiTiHf shape memory alloy tubes with high torque capability, Smart Mater. Struct. 28 (2019) 085035 (12pp).

(Continued)

*Primary Examiner* — Hoang M Nguyen
(74) *Attorney, Agent, or Firm* — Robert H. Earp, III; Mark Wolfgang; Helen M. Galus

(57) ABSTRACT

A plurality of shape memory alloy tubes (SMTs) of one or more shape memory alloy (SMA) types is configured as an element in a rotary actuator system in a nested manner. In various configurations, the nested SMTs provide one or more modes of multiplication (torque output or angular displacement), rotation reversibility and bias loading. The innovation provides for leveraging the modes for reductions in the rotary actuator system size, weight, or complexity or combinations thereof, or providing improved and more stable actuation capabilities in a given envelope.

19 Claims, 14 Drawing Sheets

(56) References Cited

OTHER PUBLICATIONS

O. Benafan and D. J. Gaydosh, "Constant-torque thermal cycling and two-way shape memory effect in Ni50.3Ti29.7Hf20 torque tube," Smart Materials and Structures, 2018, vol. 27—075035 (9pp).
O. Benafan and D. J. Gaydosh, "High temperature shape memory alloy Ni50.3Ti29.7Hf20 torque tube actuators," Smart Materials and Structures, 2017, vol. 26—095002 (14pp).
Benafan, O., et al., "Role of B19' martensite deformation in stabilizing two-way shape memory behavior in NiTi." Journal of Applied Physics 112.9 (2012): 093510.

* cited by examiner

SHAPE MEMORY ALLOY NESTED ROTARY ACTUATOR

CROSS-REFERENCE TO RELATED APPLICATIONS

This application claims the benefit of U.S. Provisional Patent Application Ser. No. 62/797,727 entitled "Shape Memory Alloy Nested Rotary Actuator" filed on Jan. 28, 2019, the entirety of which are incorporated by reference herein.

ORIGIN OF THE INVENTION

The invention described herein was made in the performance of work under a NASA contract (NNC13BA10B) and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

TECHNICAL FIELD

The innovation generally relates to actuators, actuator systems, or improvements thereof for a class of mechanisms that use Shape Memory Alloy (SMA) material and features beneficial power/footprint considerations for engineering tradeoffs. Specifically, a plurality (which may provide scalability) of SMA elements (such as may be shaped into tubes, or SMT (shape memory tubes), for example) may be configured to provide components/mechanisms/systems for rotary actuation.

Shape memory alloys (SMAs) in the form of torque tubes (SMTs or Shape Memory Tubes) have been established as a feasible method for rotary actuation. These SMTs produce a rotation about their longitudinal axis when subjected to a thermal stimulus with or without an externally applied torque (for SMA that is thermally reactive). In the process, an immense work output can be generated which may be comparable to or improve upon conventional rotary actuators on a size basis.

BACKGROUND

Rotary Actuators, as key components of most aircraft and other structures, allow for a change of physical configuration on-demand such as moving aircraft flaps, opening valves, or the lowering of landing gears etc. While it is customary to use conventional versions of such devices in large aerospace structures, there are still many challenges associated with such devices that contribute to system inefficiency (for example, air drag, fuel consumption, noise). This is largely due to the mass, footprint and power requirements that are very limiting and impose one or more design constraints. Thus, there is a need for compact, lightweight and simple rotary actuators that can be used to (i) replace current state-of-the-art and (ii) enable entirely new applications. Aircraft, spacecraft, marine vessels, automobiles, amongst others, most all may employ such conventional devices and several improvements can be achieved via new technologies.

Conventional actuators may include hydraulic actuators. Hydraulic actuators use hydraulic power to facilitate a mechanical process. They typically consist of cylinders and pistons, fluids (like oil), and a pump or other means to deliver the fluid pressures. While these actuators deliver very precise movement, the size and weight of the total system can be massive, which therefore may limit their application. Also of concern may be that the fluid in hydraulic actuators might leak and contaminate surroundings. Pneumatic actuators are also conventional, and work on the same concept as hydraulic actuators except using a gas instead of liquid. The needed energy is supplied in the form of compressed gas, which is converted into linear or rotary motion, depending on the type of actuator. Pneumatic actuators may leak, making them less efficient compared to mechanical actuators. Pneumatic actuators may also take up a lot of space, create a lot of noise and may be difficult to transport once installed in a place. Another conventional type of actuator is electric actuators. Electric actuators are devices powered by motors that convert electrical energy to mechanical torque. The power densities are limited. A further conventional actuator is mechanical actuators. These may be considered to be mechanical devices that function through converting rotary motion to linear motion directly through and with the assistance of devices such as gears, belts, pulley, chain, bearings, acme screws and the like. While it is to be appreciated that the conventional actuators may provide benefits in situations in which speed of deployment or frequency of action is high, it is also to be appreciated that multiple components that equate to complex designs may also lead to multiple failure modes.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

This innovation uses SMAs that have the unique ability to recover large deformations in response to thermal, mechanical and/or magnetic stimuli. As is known in the art, SMA behavior occurs by virtue of a crystallographically reversible martensitic phase transformation between a high symmetry parent austenite phase and a low symmetry martensite phase. In general, when the material is deformed in the martensitic condition, the induced deformation can be recovered by applying a stimulus above certain magnitude (e.g., temperature, load, magnetic field), but as long as the critical transition point is not reached it will retain the deformed condition indefinitely until actuated (e.g., heated). The innovation may advance SMA technology by utilizing a plurality of nested torque tube configurations. The innovation may employ high force SMAs (the term 'high force' indicates that when transitioning, the force provided by the material change is relatively high) with improved properties. Such may help rotatory actuator devices and systems to provide improved stability and actuation capabilities.

It is to be appreciated that the material of the SMT itself may be considered to be a "motorized" component, that is, the material in tube form may be a moving part of a system. Rotary actuation techniques disclosed herein may be an enabler for applications where space and weight are at a premium. For example, practical applications may include using SMTs as the basis for a rotary motor in aircraft surfaces, helicopter rotor blades, and wind tunnel models. Practical application of the innovation disclosed herein may be provided in many areas in which rotary actuation may be used. For example, in aeronautics, use may range from smart winglets on sub-sonic air transport to large folding wing sections with reduced rudder configurations. Supersonic and military benefits also may be rather profound as Spanwise Adaptive Wing technology (SAW) may enable tailless supersonic flight. Application may be found in most any control surface packaged in a hinge line of the surface wherein the actuator volume is desired to be small (especially relative to power output). Even in aeronautics which may still use conventional actuators for certain purposes, compact ground articulating systems are another practical application as the aspect ratio and span of subsonic aircraft wings continue to grow, so does the need to develop a method to taxi through existing infrastructure. For example, wings of newer aircraft may be folded, allowing newer aircraft to maneuver through physical constraints of existing infrastructure that may have been designed for aircraft with smaller wingspans. Embodiments of the innovation may also see practical application in space applications. Often in such applications, power to envelope size is an important consideration, which makes embodiments of the innovation especially beneficial. For example, benefits of applying the innovation may be found in folding structures such as solar panels, antennas, booms, and the like post launch and in deployment while in orbit. It is to be appreciated that applications are not limited to aeronautics or space applications, and that the benefits of the innovation may be found in many envelope/power applications. For example, in automotive embodiments, applications may include door handles, hood lifts and the like. For another example, society in search of more environmentally friendly energy sources may turn to wind turbines. Such wind turbines may comprise structures with large wingspans, and transport of the components may prove difficult on the nation's roads. Application of nested rotary actuators according to the innovation may provide capability of folding large wings prior to and after transport. Other examples include applications that consider high power/weight and stroke/weight ratios, that include lightweight or compact form (smaller footprint, package) and/or reduced complexity (fewer part count, cost) considerations.

When compared to the current state of the art devices, this technology may provide a lighter weight, higher power density actuation device or system. The innovation allows for reducing risk and increasing reliability. In embodiments, use of SMAs and mechanical design allows the hardware to be integrated into smaller packages with similar or higher output angles, or similar or higher force output, or reversible output configurations, or use as a bias load return mechanism.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example. The patent or application file contains at least one drawing executed in color. Copies of this patent or patent application publication with color drawing(s) will be provided by the Office upon request and payment of the necessary fee.

DETAILED DESCRIPTION

Figure 1:
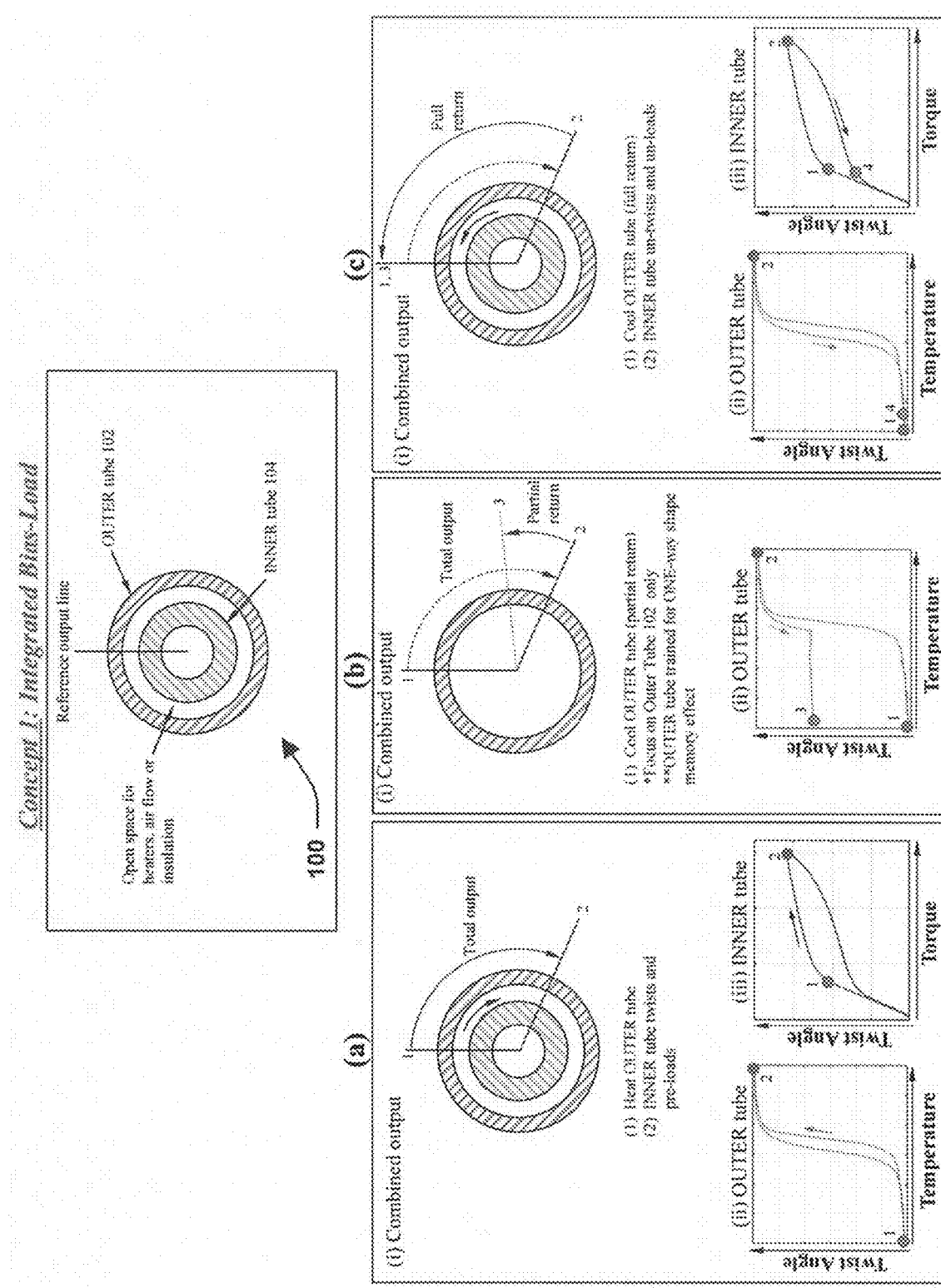
FIG. 1 illustrates a cross section depiction of an example nested Shape Memory Tube (SMT) embodiment along with use features relating to aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

For the sake of clarity, the disclosure will focus on the Shape Memory Tubes (SMTs) made from a plurality of Shape Memory Alloy (SMA) types and embodiments of their configurations. While an embodiment of a particular system configuration is discussed, focus will be less on such items as heaters, control systems or supporting hardware. Thermal cycling of SMA material may provide the power of the material. A heating portion of the thermal cycle may be in one or more forms, for example, joule heating (that is, direct current), cartridge heaters that can be placed inside the SMA elements, induction heaters with coils around the SMA elements and the like. In some cases, even passive heating such as exhaust-heat may be used for the heating portion of the thermal cycle. It is to be appreciated that conventional and non-conventional heating may be applied in the thermal cycle. It is to be appreciated that with a plurality of concentric SMTs, embodiments may achieve better control and simplicity of the provision of heat to the SMTs, as well as obtain system envelope improvements over prior art use of SMTs. Control systems may include instrumentation of temperature, angle and load sensing and control software. Supporting hardware for actuator systems may be included such as anchoring points, holding brackets, output shaft, and the like.

In general, SMTs may be nested concentrically to form rotary actuator elements for various purposes according to one or more embodiments. Selection of types of SMA, and training and configuration and SMTs may provide various example Modes as disclosed herein in more detail. It is to be appreciated that the concentricity involved in the innovation may provide a number of benefits based on embodiments that configure a particular nesting based on selection of type of SMA and training of SMT. It is also to be appreciated that while most figures and discussions focus on pairs of SMTs for clarity's sake, the innovation is not limited to only pairs of nested tubes and may include a greater plurality, along the lines of nested Russian dolls. In other words, embodiments for which an application may be less driven by diameter constraints, plurality of nesting greater than two SMTs may obtain benefits of mixing the examples disclosed herein. It is to be appreciated that flexibility of combining multiple embodiments is contemplated to be within the scope of the disclosed innovation.

Turning to FIG. 1, a cross section depiction of an example nested Shape Memory Tube (SMT) 100 embodiment along with use features (as discussed herein) relating to aspects of the innovation is illustrated. Concept 1 portrays SMT 100 with an integrated bias-load configuration. SMT 100 consists of an outer tube 102 made of a thermally activated shape memory alloy (shape memory effect), and an inner tube 104 made of a mechanically activated shape memory alloy (superelastic). When the outer tube 102 is heated, the SMA tube undergoes a phase transformation and generates an angular twist from point-1 to point-2 as shown in section (a)(i) of FIG. 1. It is to be appreciated that "point-1" is associated with a state at condition 1, while an action at a state may be designated in the figure as, for example heating being displayed as (1). Section (a)(ii) of FIG. 1 presents a heating response curve of SMT 100. As outer tube 102 twists, inner tube 104 is preloaded, resulting in a build-up of torque from point-1 to point-2. This is shown in section (a)(iii) of FIG. 1. In an embodiment, inner tube 104 may not start from a zero torque level, but rather it can be loaded as part of the design to take advantage of a shallow slope from point-1 to point-2 of the mechanical loading graph as shown in section (a)(iii) of FIG. 1. The small angle indicates a constant or pseudo-constant torque response. The relative flatness of the plateau is advantageous and may be used in many applications such as in medical devices. For SMT 100, the combined response from the outer 102 and inner 104 tubes may result in a total output rotation against some load as schematically depicted in (a)(i) of FIG. 1.

Section (b) of FIG. 1 provides consideration of SMT 100 behavior focused on outer tube 102. Outer tube 102 may partly untwist upon cooling from point-2 to point-3 as shown in section (b)(ii) of FIG. 1. This results in a partial return of the SMT 100 response as shown in section (b)(i) of FIG. 1. It is noted that in this embodiment, the thermally activated outer tube 102 is trained for a "one-way effect", where an external load is required to untwist the tube completely back to the original position denoted by point-1. In other words, in embodiments, an inner tube 104 may be sized and trained such that the return assist force is sufficient and no other return assist mechanism may be necessary. Training of tubes will be discussed in more detail later.

It is to be appreciated that the presence of inner tube 104 may provide a portion or all of a return load (called bias-load) to untwist the outer tube 102 while that tube is cooling in order to return outer tube 102 back to an original state, as shown in section (c)(ii) and (iii) of FIG. 1 for inner 104 and outer 102 tubes, respectively. It is to be appreciated that point-4 is shown right of point-1 merely for clarity's sake (as may be seen in (c)(iii) as point-1 and point-4 have the same twist angle.

From a perspective of SMT 100, the combined cooling of the outer tube 102 plus the unloading of the inner tube 104 provides a full return output of SMT 100 as depicted in section (c)(i) of FIG. 1.

It is to be appreciated that a conventional employment of a bias-load may be provided by an external (to SMT 100) mechanism such as springs, linkage arms or other means. Such conventional methods require added footprint to an actuator using SMT 100, and may be typically complex from a system integration standpoint. Moreover, using bias loading elements such as springs may provide a non-constant load following a spring rate, and as a result, actuation work output may be impacted in a disadvantageous manner. SMT 100 may provide advantage over the conventional method by addressing shortcomings by having a biasing element inside the SMA outer tube (that is, no added footprint), and by taking advantage of mechanical loading features of the materials as shown in a flat plateau, resulting in the improved capability to provide a constant load as the inner tube 104 twists. It is to be appreciated that such may ensure a full return on cooling for outer tube 102.

In other words, SMT 100 presents a mode of bias loading (or the capability to act as a return assist mechanism). It is to be appreciated that in embodiments, a biasing load may be provided in which one or more tubes may be in a superelastic form and provide a biasing load in accordance with the thermal cycle and the loading configuration.

It is also to be appreciated that in embodiments SMA material may be most any SMA material (e.g., NiTi NiTiX (where X=Hf, Zr, Pt, Pd, Au, Fe, Co, or combination thereof, CuAl-based alloys, Fe-based alloys, etc.) that responds to an external stimulus such as temperature or load. As discussed in regards to SME 100, aspects of the innovation may involve more than one type of SMA material. It is to be appreciated that certain SMA material responds to temperature, providing what may be called shape memory effect. It is also to be appreciated that other SMA material may be less responsive to temperature, but instead respond to force or load. These other SMA materials may be called superelastic. It is to be appreciated that heating a combination of SMA materials may provide a first material to respond with a shape memory effect, and that this shape memory effect, in addition to outputting a torque (as disclosed herein) provides a force to a second SMA of a load responding type. In other words, the heat portion of a thermal cycle provides the input by way of force to the superelastic SMA. At the conclusion of the heat portion of the thermal cycle, and in the cooling portion, the second material may provide its response to the stimulus of load induced during the heat portion of the thermal cycle. It is to be appreciated that the force profile of a superelastic SMA is one of a near constant force output.

Figure 2:
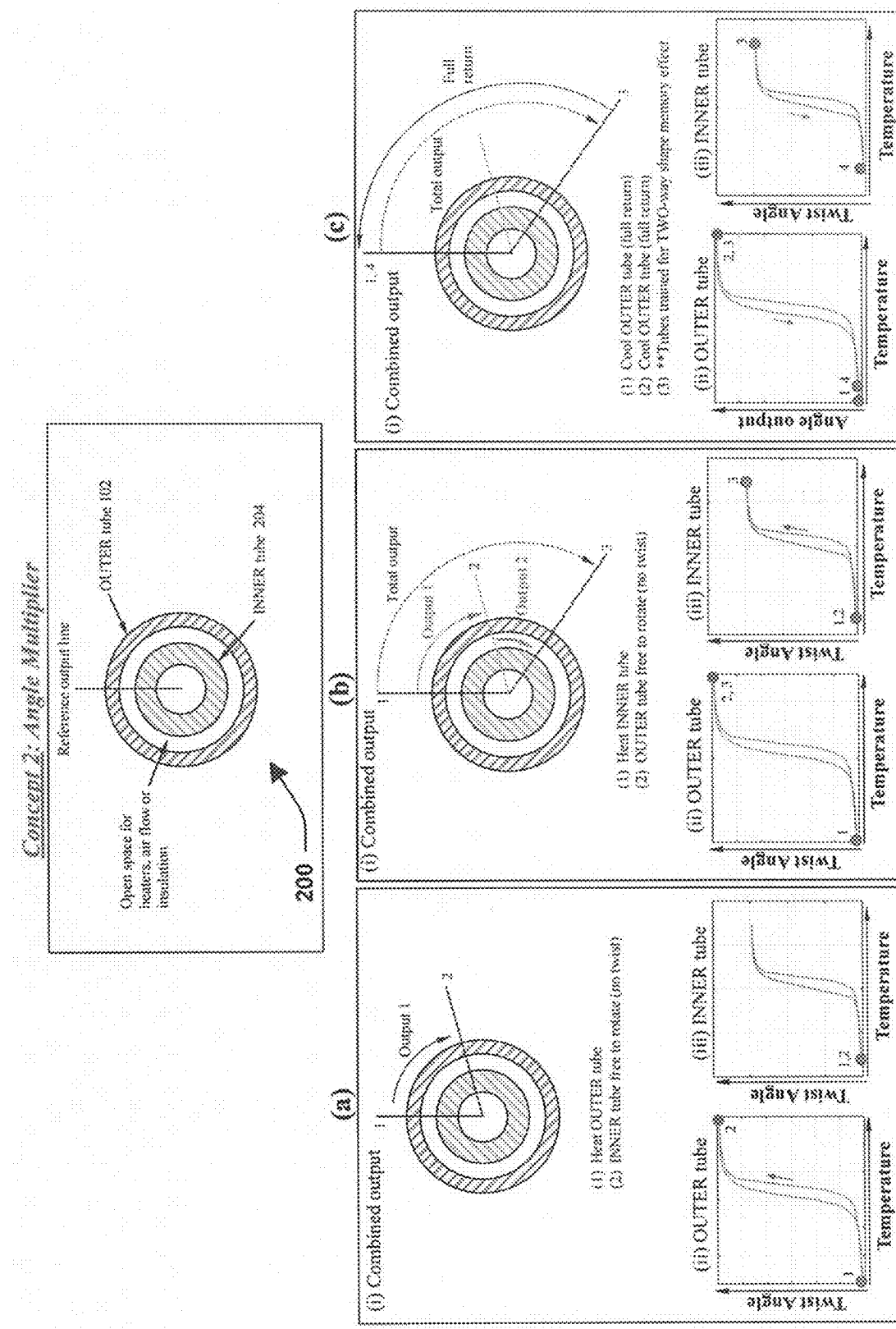
FIG. 2 illustrates a cross section depiction of an example SMT embodiment along with use features relating to aspects of the innovation.

Turning to FIG. 2, a cross section depiction of an example nested SMT 200 embodiment along with use features (as discussed herein) relating to aspects of the innovation is illustrated. Concept 2 portrays SMT 200 with an angle multiplier configuration. In this case, both the outer tube 102 and inner tube 204 may comprise a thermally activated type of SMA. Shape memory effects of the SMA are employed in series. First, outer tube 102 may be heated to generate an angular twist from point-1 to point-2 following the response shown graphically in section (a)(ii) of FIG. 2. It is to be appreciated that "point-1" is associated with a state at condition 1, while an action at a state may be designated in the figure as, for example heating being displayed as (1). Sub-sections (ii) and (iii) of sections (a), (b), and (c) of FIG. 2 present heating response curves of outer tuber 102 and inner tube 204 respectively of SMT 200.

It is to be appreciated that during heating of outer tube 102, inner tube 204 may be maintained cooled and may freely rotate without generating any twist or torque (for example with the use of ratchet and/or locking features, not shown). A combined response for SMT 200 is an output rotation from point-1 to point-2 against some load as schematically depicted in section (a)(i) of FIG. 2.

It is to be appreciated that as inner tube 204 is heated, a twist is generated from point-2 to point-3 while the outer tube may be free to rotate (that is, incur no additional twist) as shown in sections (b)(ii) and (iii) of FIG. 2. This results in a combined total output rotation of SMT 200 with contributions from both nested tubes used in series as shown in section (b)(i) of FIG. 2. Magnitudes of twists may be dictated by at least two factors including material formulation and geometry. In regards to material formulation, alloy chemistry and processing methods may provide a first order work output potential that may ultimately prescribe how much a tube of the selected material may twist. It is to be appreciated that consistency of the reaction both for repeatedly and predictably may be advantageous. It is also to be appreciated that geometry, mainly an outer diameter of a tube and an overall active length, may be used in conjunction with the first order work output potential to design the component based on various system variables, such as for example, available footprint and amount of desired twist.

Continuing with the embodiment, upon cooling, the inner tube 204 and outer tube 102 may untwist from point-3 to point-4 as shown in sections (c)(ii) and (iii) of FIG. 2, returning the respective tubes back to their respective starting points. In this embodiment, both outer tube 102 and inner tube 204 may be trained for a "two-way effect." The training means that no external load may be required to untwist a tube completely back to an original position (as may be denoted by point-4 in this embodiment). The combined output of SMT 200 is a complete rotation back to the original position as shown in section (c)(i) of FIG. 2. It is to be appreciated that a two-way effect may allow SMA material to remember shapes on both heating and cooling without an external biasing force, a behavior known as the two-way shape memory effect (TWSME). TWSME is not an inherent behavior of SMAs, but can be obtained after specific training procedures, such as for example, thermo-mechanical training procedures. Aspects of training procedures will be discussed later. It is to be appreciated that using a two-way effect exclusively without any biasing elements may limit an available work output in a selected material, hence only a portion of a material actuation prospective may be used. In other words, there is a tradeoff of usable power versus envelope versus complexity.

Figure 3:
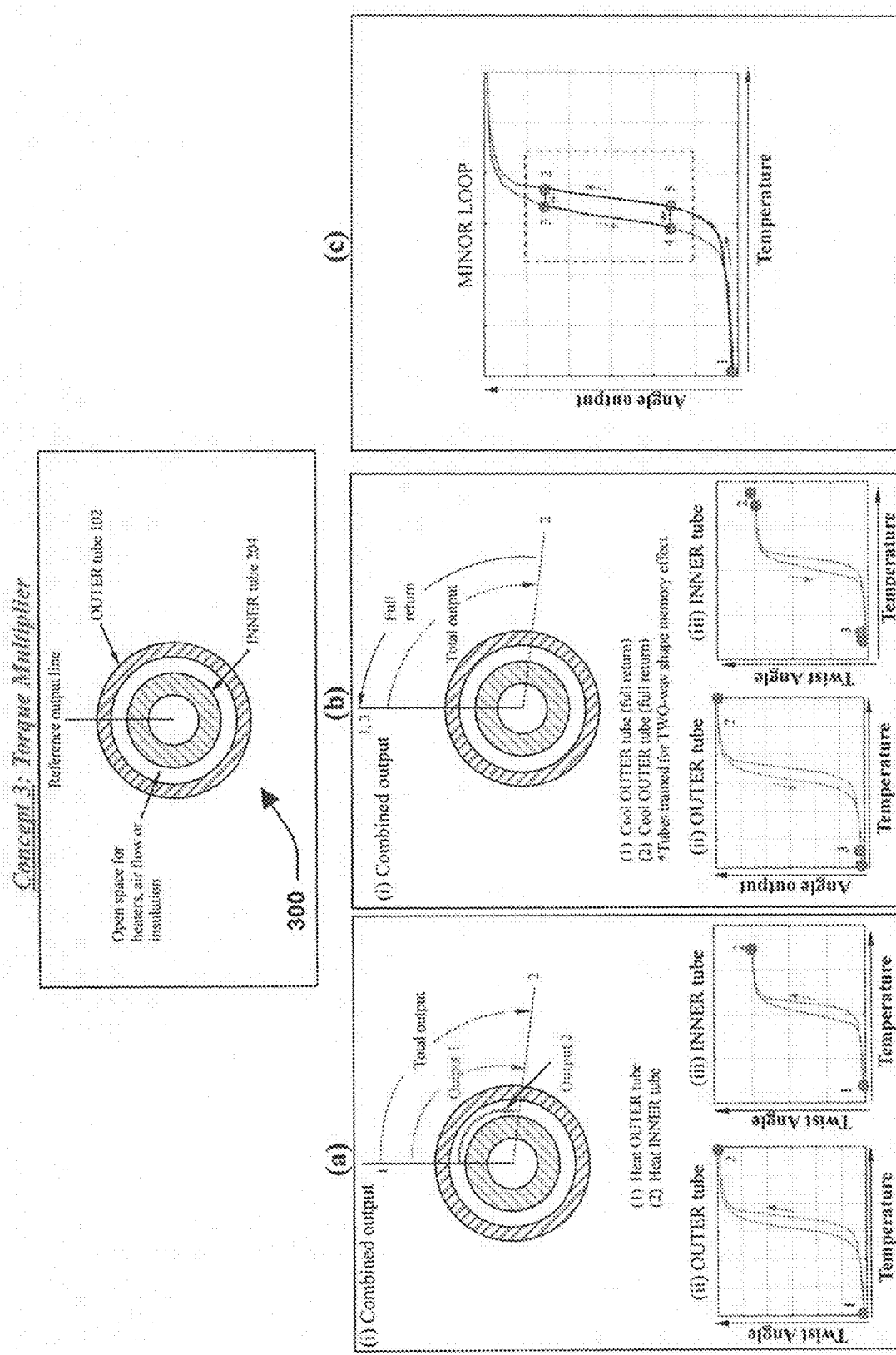
FIG. 3 illustrates a cross section depiction of an example SMT embodiment along with use features relating to aspects of the innovation.

Turning to FIG. 3, a cross section depiction of an example nested SMT 300 embodiment along with use features (as discussed herein) relating to aspects of the innovation is illustrated. Concept 3 portrays SMT 300 with a torque multiplier configuration. In this case, both the outer tube 102 and inner tube 204 may comprise a thermally activated shape memory type of SMA. Shape memory effects of the SMA are employed in parallel (at the same time). For example, gears (not shown) may be employed to connect both tubes on a same output shaft (not shown). In this embodiment, both the outer and inner tubes are heated simultaneously from point-1 to point-2 as shown in sections (a)(ii) and (iii) of FIG. 3, generating a combined twist against some torque. It is to be appreciated that "point-1" is associated with a state at condition 1, while an action at a state may be designated in the figure as, for example heating being displayed as (1). Sub-sections (ii) and (iii) of sections (a), and (b) of FIG. 3 present heating response curves of outer tuber 102 and inner tube 204 respectively of SMT 300. In this embodiment, both tubes may work together to amplify a torque capability, even as the amount of twist (angular displacement) is equal in both tubes as shown in section (a)(i) of FIG. 3.

It is to be appreciated that upon cooling, both inner tube 204 and outer tube 102 may untwist to the respective original states, for example, from point-2 to point-3 as shown in sections (b)(ii) and (iii) of FIG. 3. In an embodiment, a combined output may be a full return based on a "two-way effect" training as described above. In an embodiment, action of SMT 300 may cycle inside a hysteresis loop (for example, as between points 2 thru 5 as shown in section (c) of FIG. 3, rather than engaging a full cycle. That is, if one, or both tubes undergo a partial phase transformation in which the SMA material does not phase transform fully (the respective one or both tubes do not twist fully). This action may be referred to as acting in a minor loop. It may be advantageous in embodiments to act in a minor loop, given that the tube sizes (inner and outer diameters) of the respective inner tube 204 and outer tube 102 are different. An example of a benefit of acting in a minor loop may be provided in a situation in which a rotation amount (angular displacement) may be provided from an SMT that is greater than a particular application's need for angular displacement. For example, an SMT may be able to provide 120 degrees of rotation per full thermal cycle. If an application requires but a 90-degree rotation, less than a full thermal cycle would provide the required rotation for that application. In this instance, operating in a minor loop would provide an accelerated timeframe for achieving the required rotation (faster actuation rates). Temperature cycling need not be throughout the range that a full thermal cycle would provide. Less energy may be required for the lower temperature differentials involved in operating in a minor loop.

In general, an embodiment may include a Multiplier mode. A Multiplier mode may multiply one or more aspects of the actuator system. In an embodiment, an apparatus may be comprised of a plurality of SMTs with different geometries nested within each other to act as an output multiplier. For example, the plurality may include one or more of each of SMT 200 and SMT 300. It is to be appreciated that output to be multiplied may be angular twist, force of angular twist or a combination thereof.

In embodiments, the action of multiplying may be twist-angle multiplier or force (torque) multiplier. For the same overall actuator length, an embodiment may be used to multiply the output angle proportional to a number of SMT pairs. It may be advantageous for embodiments and applications may apply such configurations depending on control and actuation of thermal cycle for a desired SMA effect. It is to be appreciated that for either aspect (or combinations thereof) of multiplier action, given a determined envelope, or limited workspace, an embodiment may be used to provide a reduction in system parameters because of a multiplied effect. For example, system parameters may include length reduction in which the reduction would be proportional to either (or in some embodiments a combination of) multiplied angular twist effect or multiplied force or torque effect. Such a length reduction may be proportional to a number of folds, or in other words, a number of SMTs. It is to be appreciated that the number may include one or more of each of SMT 200 and SMT 300. It is also to be appreciated that in some embodiments, an output from a plurality of SMTs may be proportional, while in other embodiments, the output may provide a constant force profile. In this and other embodiments, reduction in envelope may also occur with use of the annular space between nested SMTs for such items as means for thermal cycling (for example, heating elements of various types may be configured in the annular space between the nested SMTs). An apparatus may be comprised of SMA tubes conditioned (or trained) to a specific torque limit, with constrained or floating ends. It is to be appreciated that thermal cycling is used in such a system to affect the properties of SMA. Additional detailed discussion regarding peripherals such as heating and control is provided herein.

Figure 4:
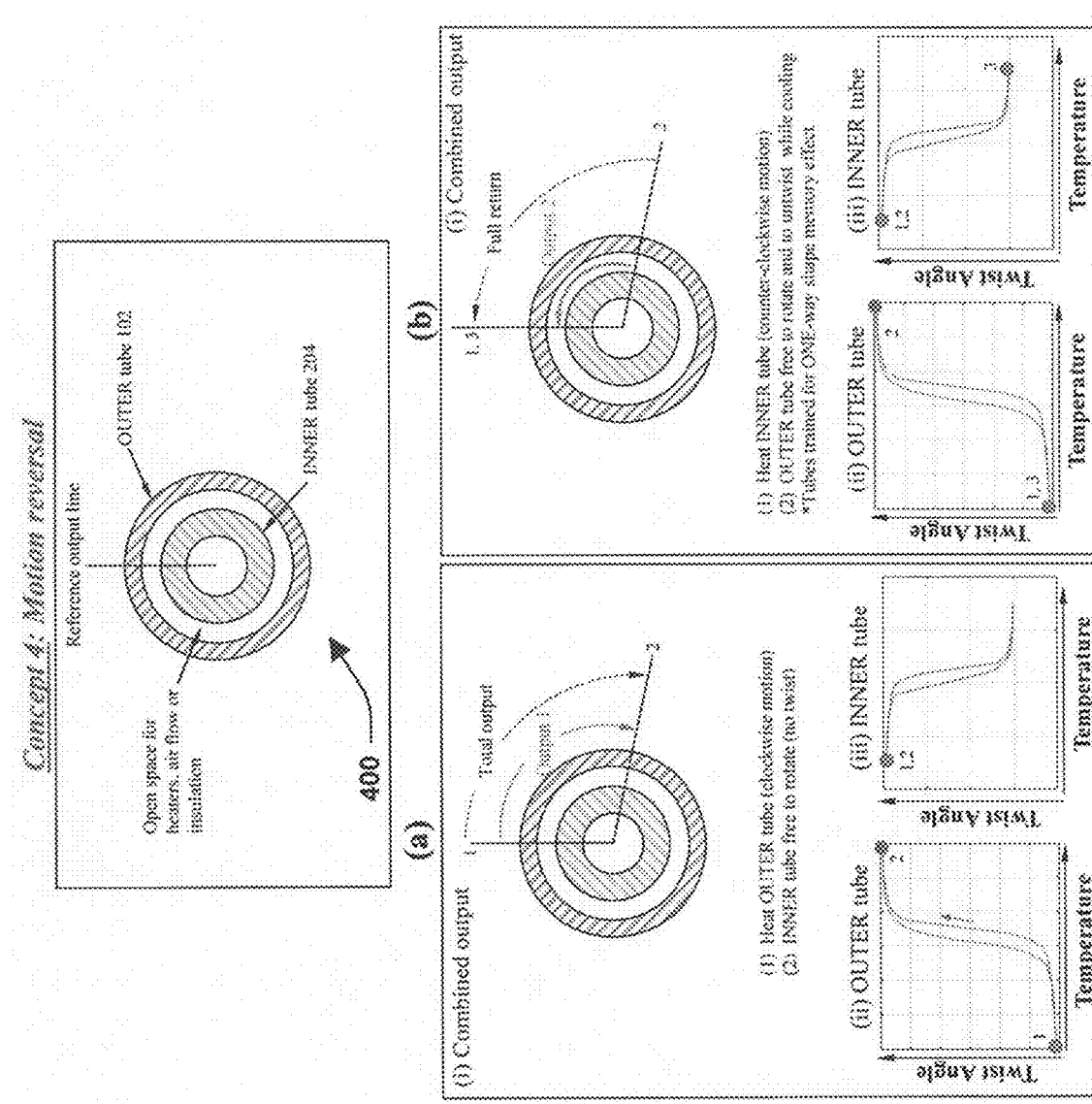
FIG. 4 illustrates a cross section depiction of an example SMT embodiment along with use features relating to aspects of the innovation.

Turning to FIG. 4, a cross section depiction of an example nested SMT 400 embodiment along with use features (as discussed herein) relating to aspects of the innovation is illustrated. Concept 4 portrays SMT 400 with a motion reversal configuration. In this case, both the outer tube 102 and inner tube 204 may comprise a thermally activated shape memory type of SMA. Shape memory effects of the SMA are employed individually to rotate in opposing directions. Outer tube 102 may be heated to generate an angular twist from point-1 to point-2 following the response shown graphically in section (a)(ii) of FIG. 4. It is to be appreciated that "point-1" is associated with a state at condition 1, while an action at a state may be designated in the figure as, for example heating being displayed as (1). Sub-sections (ii) and (iii) of sections (a), and (b) of FIG. 4 present heating response curves of outer tuber 102 and inner tube 204 respectively of SMT 400.

It is to be appreciated that throughout heating of outer tube 102, inner tube 204 may be maintained cooled and may freely rotate without generating any twist or torque as shown in section (a)(iii) of FIG. 4. A combined response is an output rotation from point-1 to point-2 against some load as schematically depicted in section (a)(i) of FIG. 4. Unlike other embodiments, inner tube 204 in this embodiment may be configured with a reverse twist direction. This may be accomplished by various means including training inner tube 204 in an opposite direction that outer tube 102 reacts in, or by constraining inner tube 204 mechanically in the reverse direction.

In order to return to its initial state, inner tube 204 may be heated, and as noted, may twist in the opposite direction as shown in section (b)(iii) of FIG. 4. This occurs while outer tube 102 is free to rotate as it cools (as shown in section (b)(ii) of FIG. 4). Embodiments may coordinate this motion with locking features and/or ratchets to ensure a properly sequenced motion. As a result, the combined output is a full return to the original position as shown in section (b)(i) of FIG. 4.

Although this concept does not require an external bias element to reverse the combined actuator motion, a bias force, either by means of external mechanical components or via a two-way effect, may be desired to assist each tube to untwist during cooling in some embodiments.

It is to be appreciated that this embodiment may be considered to improve an actuation bandwidth (actuation rates) as the motion may be entirely controlled by heating inner tube 204 or outer tube 102, and need not depend on cooling to reverse an initial motion.

Figure 5:
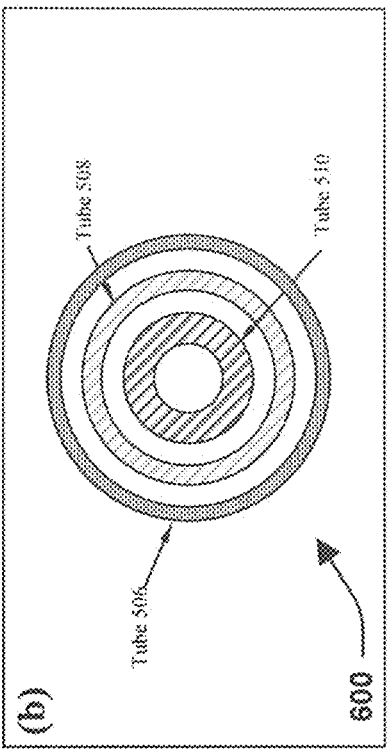
FIG. 5 illustrates cross section depictions of alternate examples of SMT embodiments relating to aspects of the innovation.
Figure 5:
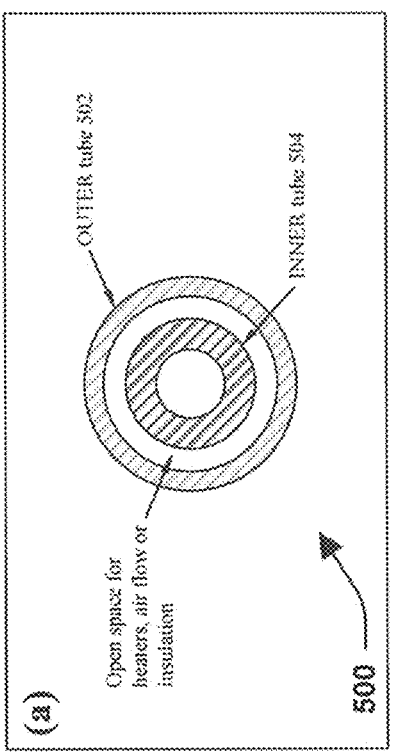

As with other embodiments, a Russian Doll effect may be configured in that there may be more than a pair of concentric SMTs. Turning quickly to FIG. 5, and in particular to section (b) of FIG. 5, Concept 6, in a mode of rotation reversal, may illustrate a version of Concept 6 in which an embodiment may be used as a rotation reversal, with one or more tubes configured to turn clockwise and the other one or more tubes configured to turn counterclockwise. In this mode, a type of SMA used in the nested tubes may be of the same type (for example, responsive to heat). It is to be appreciated that in this mode, the heat portion of the thermal cycle may be more complicated, with one or more additional layers of heat source, accompanied by one or more additional layers of thermal insulation. It is also to be appreciated that effects may be a combination of other embodiments and may be based on choices of tube material, training, thermal cycling and control thereof, and supporting components.

Section (a) of FIG. 5 illustrates Concept 5 in a specific example of an earlier detailed embodiment (SMT 100) that may be configured into a reverse arrangement to create a new embodiment, SMT 500. It is to be appreciated that disclosed embodiments with different types of SMA material in combination may be configured with types of material exchanged to achieve different results. For example, it is to be appreciated that while the example embodiment of SMT 100 may provide for a return assist mechanism (as discussed herein, in that a heat-responsive SMA type comprised an outer tube 102 and a force-responsive SMA type comprised an inner tube 104, other applications may indicate a desire to switch the types between their respective positions. In an embodiment, it is to be appreciated that a heat response material (or heat mechanism) may provide a stronger reactive force than a force response material (or force mechanism). As discussed with SMT 100, the greater force mechanism was located in the outer position, and since a return assist mechanism need not be as strong, the inner SMT employed a force SMA type. SMT 500 presents a configuration in which outer tube 502 comprises SMA of a superelastic type, while a thermally reactive SMA type may comprise inner tube SMT 504. It is to be appreciated that with selective sizing of diameters and wall thicknesses, a balance may be obtained to satisfy a set of desired actuation forces and rotations. Some embodiments may exchange the materials for a different force effect. An example embodiment 500 represents a switch between the inner tube and outer tube of SMT 100 (as to their respective SMA types). SMT 500 may be viewed as a torque rod embodiment in which a constant or near constant force is desired as output. In such an application, the outer tube 502 (of force SMA type) may be kept in an elastic region (not shown). The load on the torque rod may be constant and thus tune the force rod. By merely controlling the level/timing or other control of heat for the nested SMT component, and by using an inner tube 504 of heat responsive SMA type, the outer load rod can be adjusted to a different constant output without changing most any mechanisms in such a torque rod system.

Figure 6B:
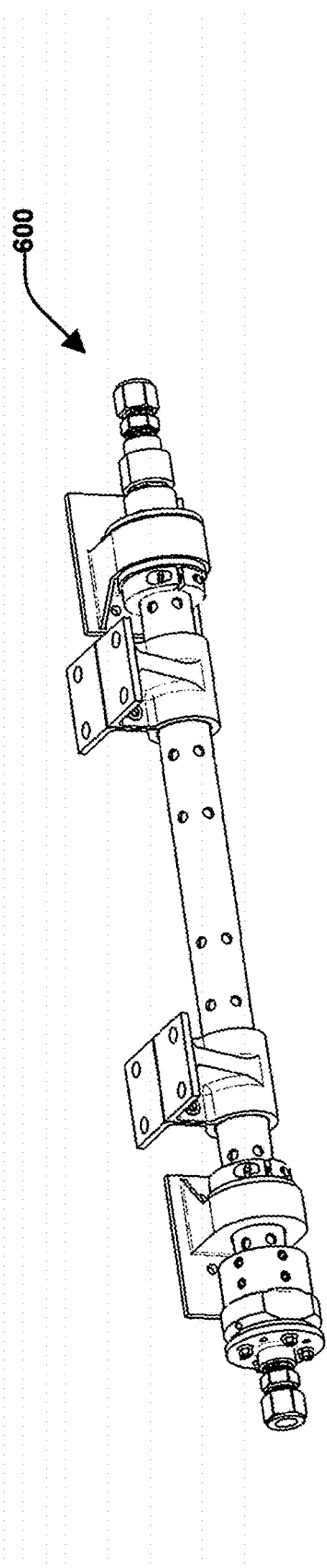
FIGS. 6A and 6B provide an exploded view of an example assembly in order to illustrate an example assembly and assembly procedure relating to aspects of the innovation.
Figure 6A:
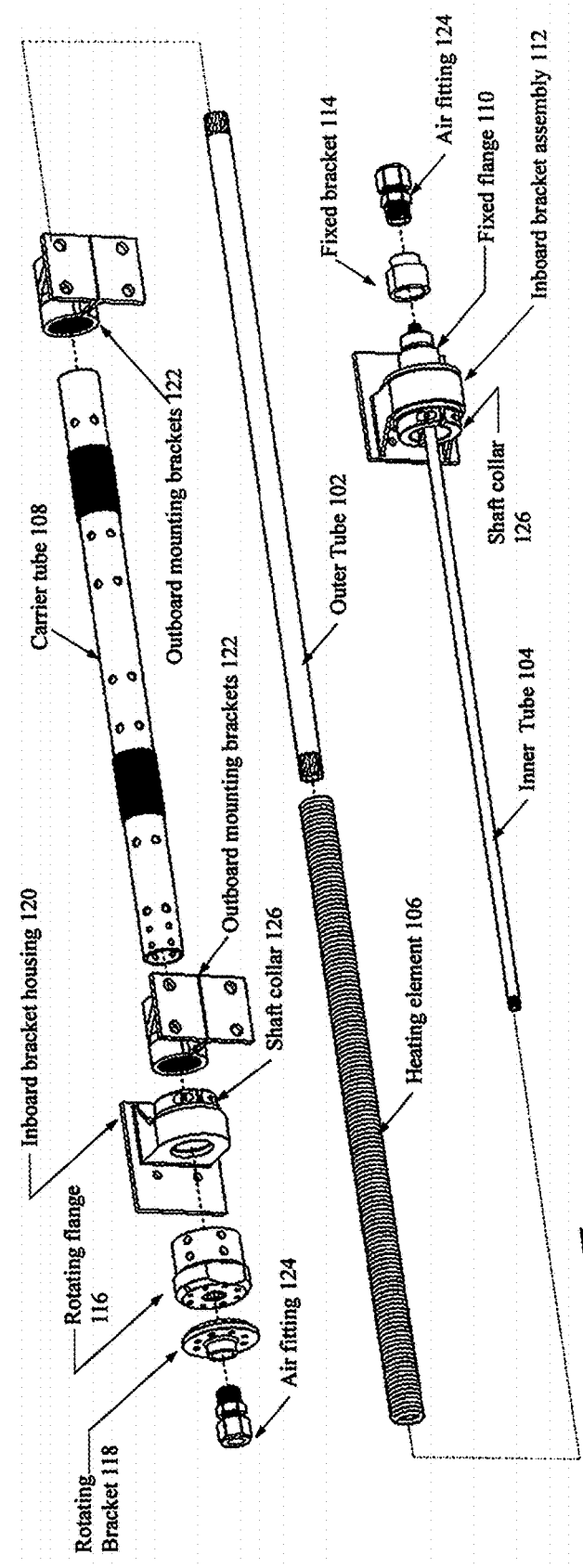

Now turning to FIGS. 6A-6B, an exploded view of an example assembly as well as an isometric view of a completed example assembly are illustrated. These illustrate an example assembly and assembly procedure relating to aspects of the innovation, and embody an example of tube constraints corresponding to a nested tube with a bias-load configuration as discussed previously (for example SMT 100).

FIG. 6A in an exploded view shows a superelastic inner tube 104 that fits inside a larger, thermally activated outer tube 102. It is to be appreciated that a gap between outer tube 102 and inner tube 104 may be maintained and used for insulation, heaters, fluid flow, or other usage. In other words, the gap may be advantageous in thermally isolating inner tube 104 from any heat imposed on outer tube 102. In this example, a gap is maintained, and an example heating element 106 may be placed in the annulus between outer tube and carrier tube 108. It is to be appreciated that more than one annular gap may be used for flowing air or other fluids, and such flow may provide either (or both) assistance with cooling of the outer tube 102 (and thus obtain higher actuation rates), and keeping inner tube 104 at relatively constant temperature as to not alter the mechanical bias response. Heating element 106, (for example, induction heater coils) may be wrapped in a high temperature fiberglass sleeve (not shown), and placed over outer tube 104 with a minimal clearance. It is to be appreciated that in order to direct most magnetic field (induced by the induction coils) toward the outer tube 104 and not radially out toward carrier tube 108, a magnetic flux controller in the form of putty or sheets (not shown) may be applied over the heating element 106. It is also to be appreciated that it may be advantageous for electrical isolation purposes to coat the inner diameter of carrier tube 108 with an insulating paint and Kapton tape (not shown). This may provide assistance in avoiding any shorting or electrical hazard during heater operation. In embodiments, carrier tube 108 may be designed with a hole pattern to provide additional cooling from the outside (for example, in an application with upstream air on a wing). It is to be appreciated that other embodiments of heater elements (such as for example, cartridge heaters) may be configured (and with other SMTs, for example, SMT 300, SMT 400, SMT 500 or combinations and alterations thereof).

It is to be appreciated that both outer tube 102 and inner tube 104 may be splined at their ends, using standard splining practices. In this embodiment, inner tube 104 may be also slightly longer and extend from both ends of nested SMT 100 for connection purposes. Constraining SMT 100 may be achieved with one end constrained in a fixed manner and the other end providing rotation so as to transfer the force generated from SMT 100. In an embodiment, fixed flange 110 and an inboard bracket assembly 112 may constrain a fixed end of SMT 100. Fixed flange 110 may serve to constrain outer tube 102 via internal splines, and interfaces with the bracket 112 using threads (not shown). An outer bracket 114 may serve to constrain inner tube 104, while also allowing a preloading of inner tube 104 during installation.

A similar approach may be used for the rotating end, replacing fixed flange 110 with rotating flange 116 and outer bracket 114 with rotating bracket 118. Two flanges may be used in concert to constrain both tubes using standard screws for fastening. It is to be appreciated that bearings or bushings (not shown) may be used at the rotating surfaces between carrier tube 108 and inboard bracket assembly 112.

Carrier tube 108 may convert SMT 100 twisting motion into an output actuator rotation. This may be accomplished by rigidly constraining carrier tube 108 with rotating flange 116 using for example set screws (not shown), while allowing free rotation at the fixed-end interface (for example using bearings or sleeves, as may be known in the art).

In an embodiment in which an application is configured as a winglet actuator, an inboard bracket housing 120 (for example, attaching to a fixed wing section) and outboard brackets 122 (for example, attaching to a moving wing section) may interface with the carrier tube 108 and flanges 110/116. Other features such as fluid fitting 124 may be added on each end, for example, using standard threads.

It is to be appreciated that a fixed-end sub-assembly may be completed for assembly by combining fixed flange 110 and inboard bracket assembly 112 (with an O-ring in between—not shown), inboard bracket housing 120 and a bushing (not shown). Fixed bracket 114 may be left untightened at this point until proper engagement with inner tube 104. Outer tube 102 may be engaged (with splines) against a face seal (not shown) of bracket assembly 112. In this embodiment, heating element 106 may then be slid over outer tube 104, while heater wires (not shown) may be routed out through fixed flange 110. Carrier tube 108 may be placed over heating element 108, along with a thrust bearing (not shown) and shaft collar 126. Shaft collar 126 may be tightened after carrier tube 108 completes insertion.

Outboard brackets 122 may be installed over splined sections (not shown) of carrier tube 108, and the faces of outboard brackets 122 may be positioned parallel to inboard bracket 120. On the rotating side, a similar order may be followed in which shaft collar 126, thrust bearing (not shown) and inboard bracket housing 120 are installed over carrier tube 108.

Rotating flange 116 may be placed over carrier tube 108 and engaged to outer tube 102 via the splines, and fastened using shear pins (not shown) to carrier tube 108. It is to be appreciated that a heating element portion (for example, a heater coil end) may be routed out through flange 116. It is to be appreciated that inner tube 104 may be inserted inside of outer tube 102, and connected at the fixed-end first, then at the rotating-end using rotating flange 116. It is also to be appreciated that inner tube 104 may be preloaded to attain a desired bias-load response. Finally, fluid fittings 124 may be threaded at each end.

Figure 7:
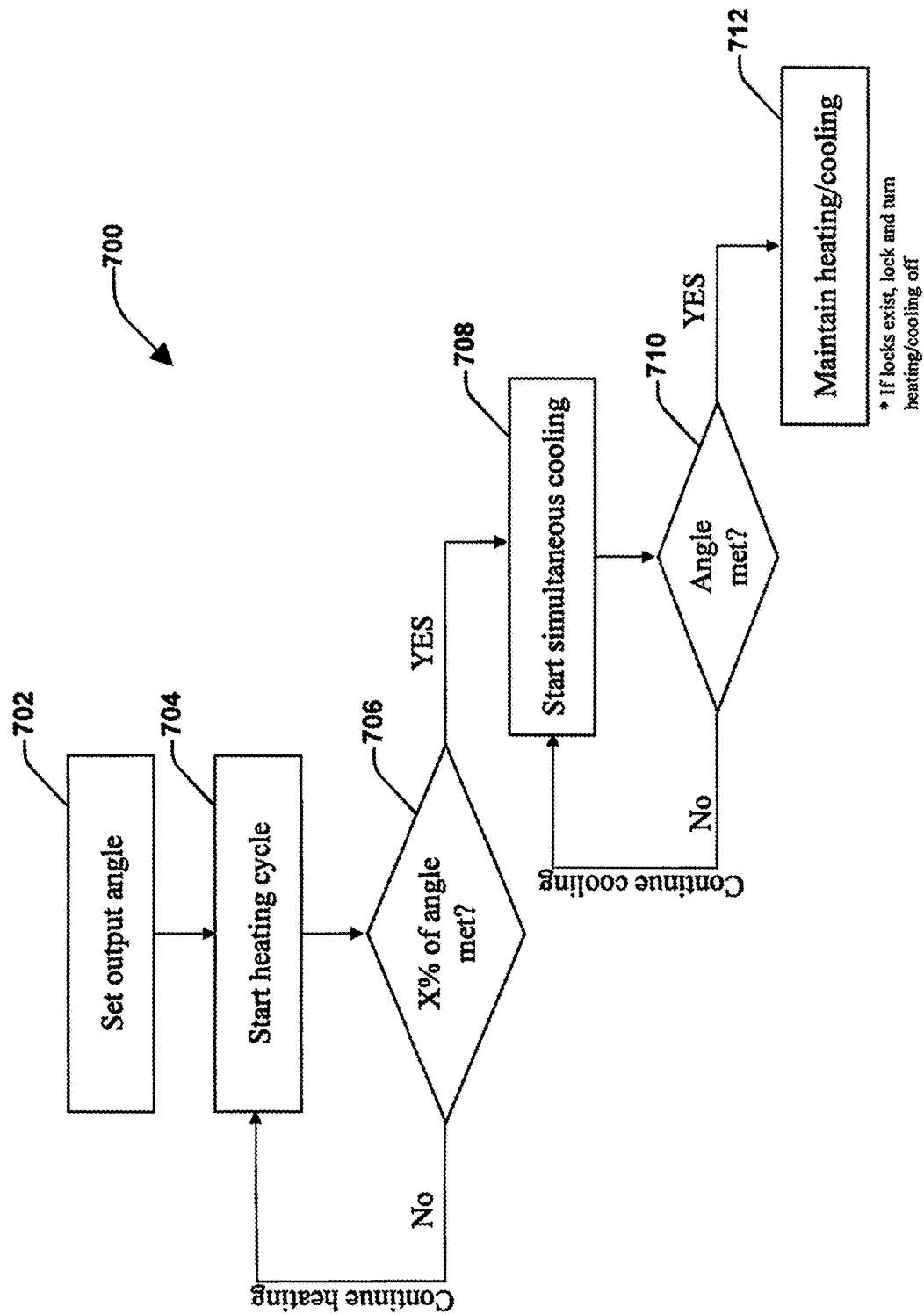
FIG. 7 illustrates an example control method relating to aspects of the innovation.

Turning now to FIG. 7, an example control method 700 relating to aspects of the innovation is illustrated. Control method 700 provides a schematic of a control architecture, and may begin at 702 with setting an output angle. That is, a desired angle of rotation is set by a user. At 704, a heating cycle may start. Depending on the specific embodiment, heating may be directed to one or more of the plurality of concentrically nested SMTs. For ease of discussion, the description of example control method 700 may be taken as an example control method for SMT embodiment 100, as discussed herein. With this example, heating the outer tube is started to generate motion. It is to be appreciated that monitoring instrumentation for safe operation within the device may occur (not shown). Initial heating cycle may be set to heat very fast until some percent of the desired angle is met (for example 80%). At 706, this condition is determined, and if the condition is not met, the control continues heating (as shown by a loop back to 704). If the condition is met, then the method progresses to step 708. At 708, it is to be appreciated that in order not to overshoot a target angle set point, cooling may be engaged (for example, during a last 20%) allowing a more accurate approach to reaching the target angle. At 710, a determination is made as to whether the target angle has been met, and if the condition is not met, the control continues operation (as shown by a loop back to 708). If the condition is met, then the method progresses to step 712. At 712, heating and cooling may be modulated to maintain the target angle. In an alternate embodiment of a locking feature existing in the system (along with related peripheries), an actuator can be locked at 712. In this case, modulation of heating and cooling need not be employed, allowing for heating and cooling to be turned off. It is to be appreciated that alternatively or in addition, other embodiments may feature monitoring of material and or component behavior, and feeding data obtained to a controller to aid in control aspects. For example, and related to an embodiment such as SMT 300, it may be advantageous to operate in a hysteresis minor loop and a controller may predict changes in thermal response to set controller gains.

It is to be appreciated that a system according to aspects of the innovation may have peripherals in one or more embodiments such as instrumentation for monitoring and controlling operation of the system. It is to be further appreciated that type and location of various sensors, such as temperature, load, twist (such as by example, a rotary encoder), and power control may be placed at various points of a system as may be understood in the art. For example, thermocouples may be used to monitor temperature throughout an outer and inner tube, as well as surrounding structure. A pre-calibrated strain gage may be used to monitor a total torque on a device. A rotary encoder or similar may be used to control a rotation angle, and a power control unit may be used to modulate heating and cooling that may be provided by one or more of various heating/cooling delivery components (such as for example induction heaters and external fans). In operation, a desired output angle may be achieved by modulating the heating and cooling using a multi-schedule, closed-loop PID controller.

It is to be appreciated that particular force levels for a nested plurality of SMTs in most any embodiment of the innovation may be achieved through sizing and training of the SMTs. It is to be appreciated that a consideration in regards to having a force SMA type for the return assist mechanism is that output of a force SMA type may be a near constant force, while the heat responsive SMA type is likely not. In an analogy to springs, for a heat responsive SMA type being a little unwound, there may be a larger drop-off in provided force, since force may diminish at a non-linear rate. It is to be appreciated that these characteristics may be taken into account for existing or new applications of the innovation. In this context, and turning to FIGS. 8A-8C, SMT training methods of various Shape Memory Alloy (SMA) material types according to aspects of the innovation are illustrated. Training here refers to a method to stabilize the thermomechanical response (for example, angle-temperature or shear strain-temperature) of a SMT. For ease of discussion in context here, it is to be appreciated that the use of "SMT" may be used in relation to a single tube, while elsewhere the term "SMT" may be used for a set of tubes. A SMT may be considered to be "trained" if both thermal and dimensional stability is achieved. It is to be appreciated that manufactured tubes of SMA material often may not be stable in their initial reactions to thermal cycling (as will be discussed in relation to FIG. 10).

Figures 8A, 8B:
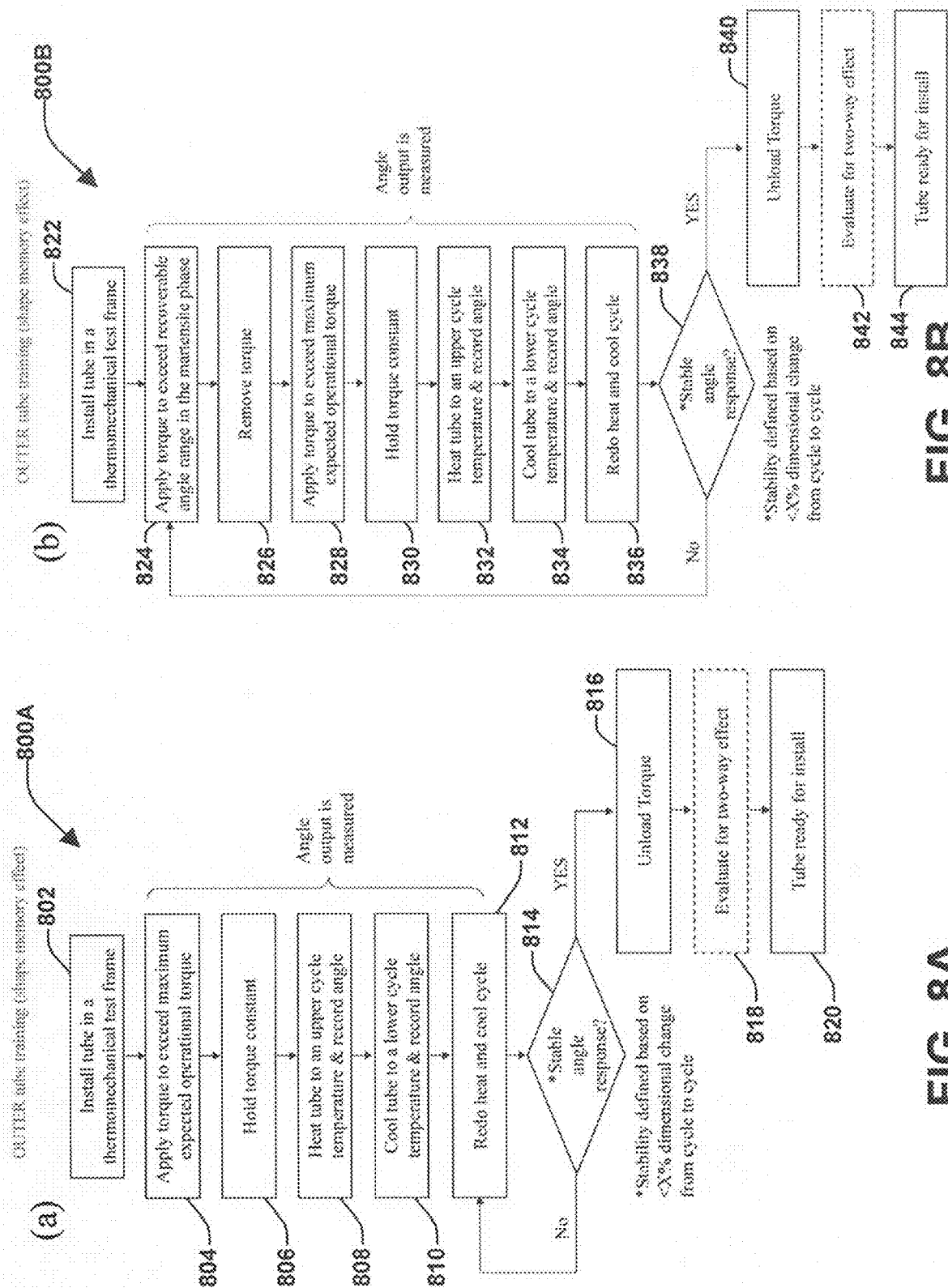
FIGS. 8A-8C illustrate SMT training methods of various Shape Memory Alloy (SMA) material types according to aspects of the innovation.

FIG. 8A illustrates a training method 800A for an embodiment of a SMT that is thermally reactive. Such SMT may be trained via thermomechanical cycling under a constant torque or constant shear stress. At 802, a SMT may be mounted on a test frame capable of measuring and/or controlling torque, rotation angle and other boundary conditions as may be applicable (e.g., strain, axial load, axial displacement), along with equipment to controllably heat and cool the SMT. At 804, torque (or corresponding shear stress) may be applied. It is to be appreciated that the magnitude applied shall be greater than an expected design load. For example, if an actuator is designed for 200 MPa shear stress, a training stress of no less than 200 MPa shall be used, such as for example 250 MPa. At 806, torque/stress may be held constant and at 808 and 810 heating and cooling between an upper cycle temperature and a lower cycle temperature may be undertaken. As indicated, throughout steps 804-812, an output angle may be monitored. Step 812 reflects that a heat/cool cycle may be repeated at a minimum twice. At 814 it is determined if the angle/strain at the maximum cycling temperature across multiple thermal cycles is the same, and if the angle/strain at the minimum cycling temperature across multiple thermal cycles is also the same. If this is not so, another cycle is executed as shown with the loop to step 812. If the determination is yes, the SMT may be considered to be trained, and the method progresses to step 816 and torque may be unloaded. It is to be appreciated that given some tubes may require thousands of cycles to stabilize, a criteria may be established such that for a change in angle/strain result to be within a set value, for example within 0.05% change, a SMT may be considered trained. Otherwise, additional thermal cycles under the same applied torque/stress are repeated. Step 818, shown in dashed line, provides an embodiment for which it may be advantageous to continue training an SMT with an evaluation for training for a two-way effect (that is, if an actuator application functionally requires a two-way effect). At 820, SMT training for a two-way effect is commenced by thermally cycling the SMT under no applied torque, with SMT ready for use as a result. Otherwise, the SMT is ready to be instrumented and installed into an actuator assembly.

Training method 800B as shown in FIG. 8B provides another embodiment of a training method for an embodiment of a SMT that is thermally responsive (or thermally reactive). In this embodiment, an SMT (for example, an outer tube 202 of SMT 200) may be trained via isothermal deformation in the cold temperature state (that is, in a fully martensitic phase). At 822, an SMT may be installed in a thermomechanical test frame or other suitable apparatus (as discussed above). At 824, torque may be applied as noted. It is to be appreciated that in this step, an SMT may be deformed by torque beyond the recoverable deformation range of the SMT (as may be considered to be beyond a martensite reorientation and detwinning plateau of the martensite phase as is known in the art). It is to be appreciated that throughout steps 824-836, an output angle may be monitored. At 826, torque is removed. At 828, torque may be applied that exceeds a maximum expected operational torque, and at step 830, this torque may be held constant for a predetermined amount of time. At 832, the SMT may be heated to an upper cycle temperature, and at 834, the SMT may be cooled to a lower cycle temperature. Step 836 indicates that the heat and cool cycle may be repeated at a minimum twice. At 838 (and after thermal cycling between an upper cycle temperature and a lower cycle temperature has been conducted for at least 2 cycles), stability may be assessed at step 838 by evaluating whether the SMT can hold stable at a torque/stress greater than the expected design load. If this determination is negative, then the method progresses to step 824. It is to be appreciated that the cycle repeats starting at 824, with an isothermal deformation step being repeated with slightly higher torque than previously. If the determination is positive, then the method progresses to step 840. It is to be appreciated that stabilization criteria may be as discussed in relation to method 800A. At 840, if the angle/strain at the maximum cycling across multiple thermal cycles is the same, and if the angle/strain at the minimum cycling temperature across thermal cycles is also the same, or if some stabilization criteria is met, the SMT may be considered to be trained.

Similar to method 800A, an evaluation for two-way effect training may be conducted at step 842. At 844, SMT training for a two-way effect is commenced by thermally cycling the SMT under no applied torque, with SMT ready for use as a result. Otherwise, the SMT is ready to be instrumented and installed into an actuator assembly.

It is to be appreciated that unlike the training procedure 800A, 800B may be executed in a very short time period and may not require the same level of cycles to stabilize the SMT (for example, hundreds or even sometimes thousands of cycles).

Figure 8C:
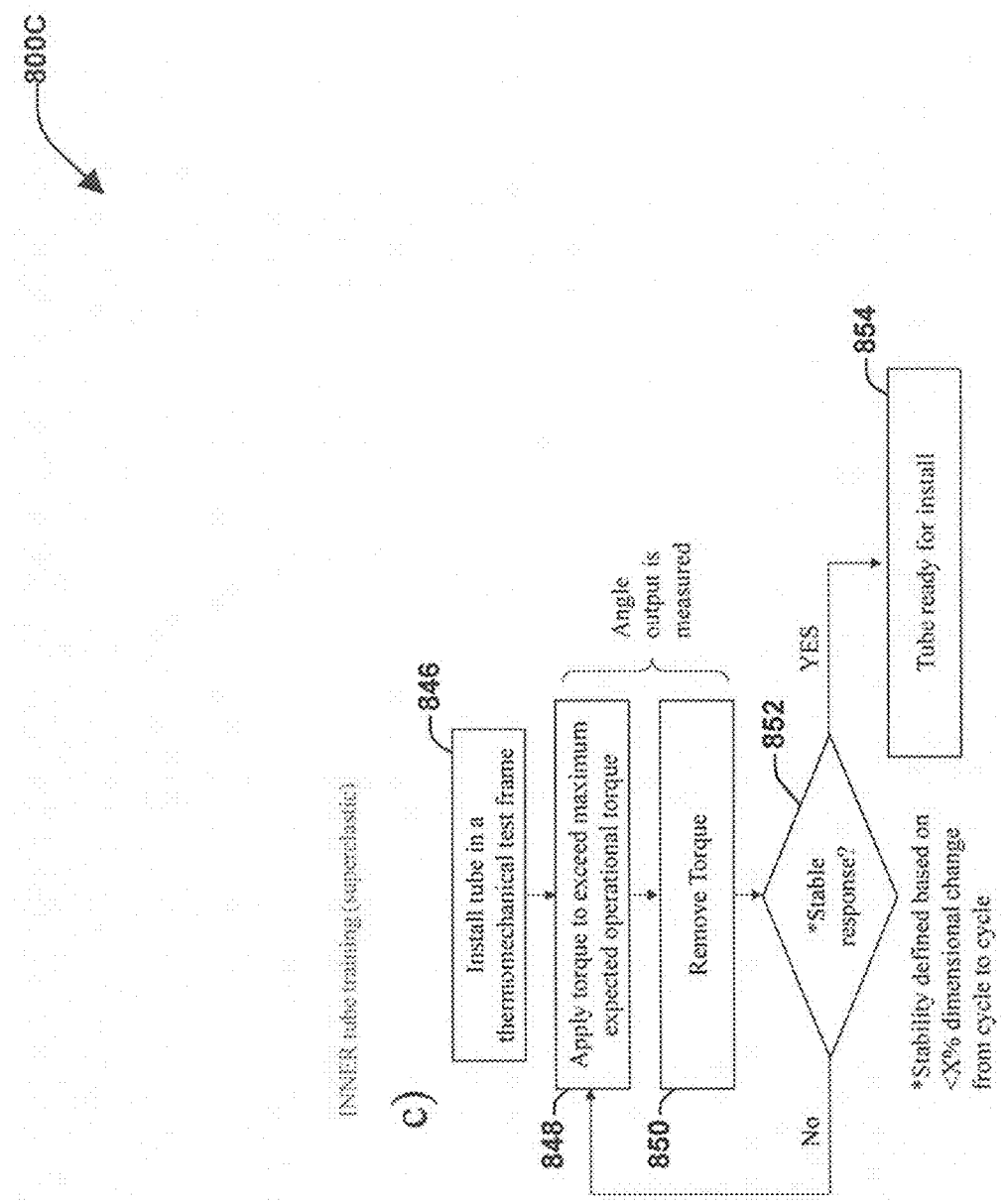

Training method 800C as shown in FIG. 8C provides another embodiment of a training method for an embodiment of a SMT that comprises a type of SMA material that is superelastic. In this embodiment, an SMT (for example, an inner tube 104 of SMT 100) may be trained via isothermal deformation starting with an austenite phase. At 846, the SMT may be installed in a suitable thermomechanical test frame (as discussed herein). At steps 848 and 850, a torque/stress greater than the expected design loads may be applied cyclically by loading and unloading the SMT between the austenite and martensite phases. It is to be appreciated that throughout steps 848-850, an output angle may be monitored.

At 852 it is determined if the angle/strain is equal to the previous cycle angle/strain. If this is not so, another cycle is executed as shown with the loop to step 848. If the determination is positive, then the method progresses to step 854. It is to be appreciated that stabilization criteria may be as discussed in relation to method 800A. At 854, the SMT may be considered to be trained, and is ready to be installed for an application.

FIGS. 9A-9E illustrate example data trends for training effects of SMA material according to aspects of the innovation. In these figures, the type of SMA material is superelastic. It is to be appreciated that depending on a specific superelastic tube material selected, there are several factors that may affect training (and ultimately SMT performance). For ease of discussion in context here, it is to be appreciated that the use of "SMT" may be used in relation to a single tube, while elsewhere the term "SMT" may be used for a set of tubes. SMTs of superelastic SMA material may comprise superelastic properties capable of large loads and twists. When twisted, such SMTs undergo a phase transition yielding a change in stiffness modulus against large deformation. It is to be appreciated that such deformation (twist) may be entirely reversible upon load removal with magnitudes in the order of 10% shear strain, which is at least 10 times more than conventional materials such as steel or titanium. Most conventional torque rods (or tubes) are limited to a region where the material is elastically deforming. Once this region is surpassed, the conventional rods may incur permanent deformation, which results in degraded performance (or most likely may require complete replacement). As a result, these conventional rods are typically made to be very long in order to obtain large twist while staying within the limited elastic region. Thus, for compact places, in which a footprint may be limited, it is disadvantageous to use conventional rods.

Figures 9A, 9B:
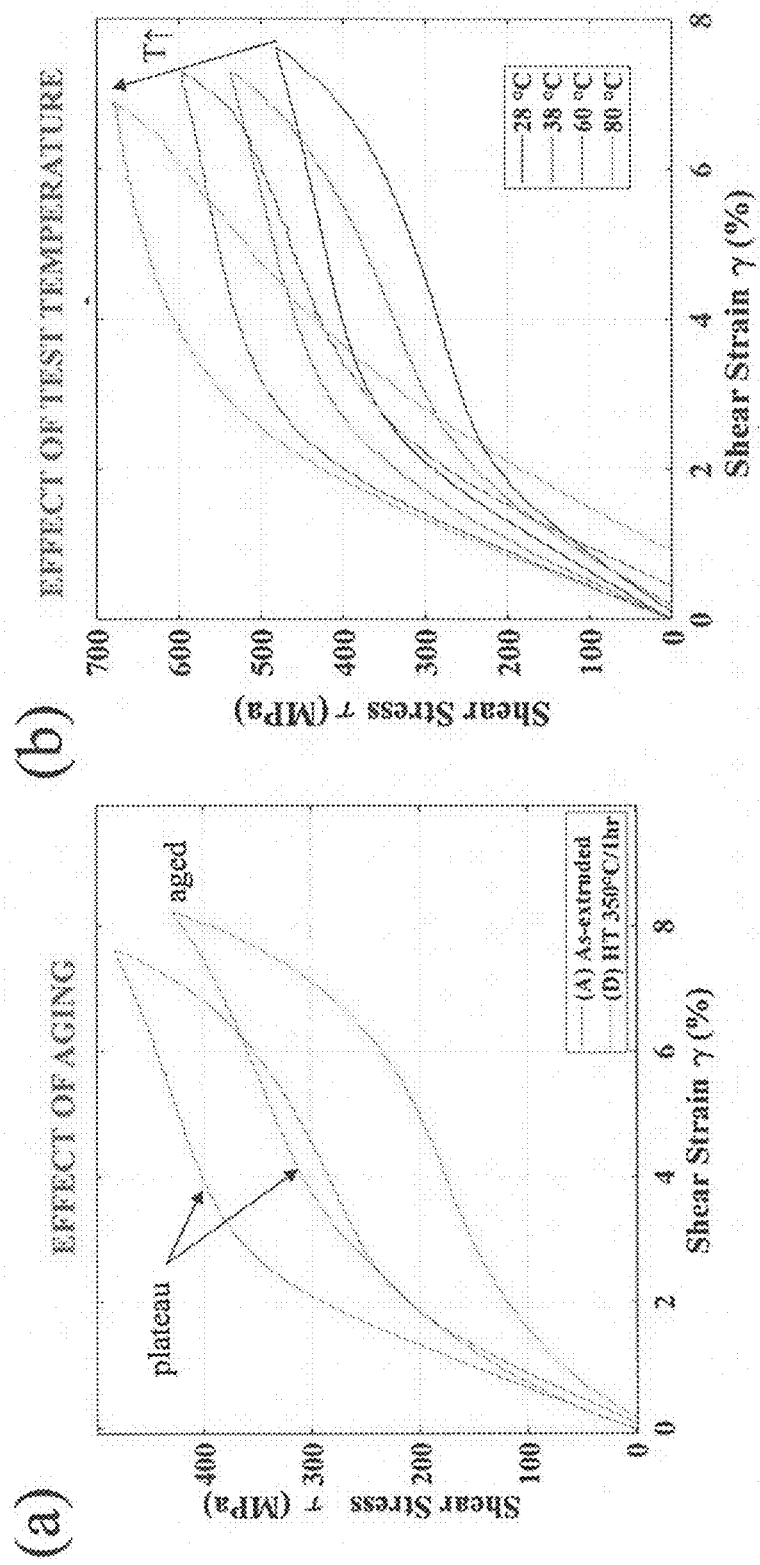
FIGS. 9A-9E illustrate example data trends for training effects of force responsive SMA material according to aspects of the innovation.

FIGS. 9A-9E embody examples of superelastic tube behavior under different conditions. FIG. 9A presents an embodiment in which an SMT has been heat-treated to control microstructure and ultimately a macroscopic response. In this example, an alloy of binary NiTi was aged to promote precipitation resulting in a more stable material with a lower plateau. It is to be appreciated that it may be advantageous to age material, for example, in order to aid in the training process (that is, provide faster training).

FIG. 9B presents an embodiment in which an SMT may be deformed at different temperatures, showing how higher plateau results may be obtained as deforming temperature increases. It is to be appreciated that a test temperature may be consistent with a final application or employment temperature. It is also to be appreciated that temperature sensitivity may be further tuned by cold working the SMT or by additional heat treatments.

Figures 9C, 9D:
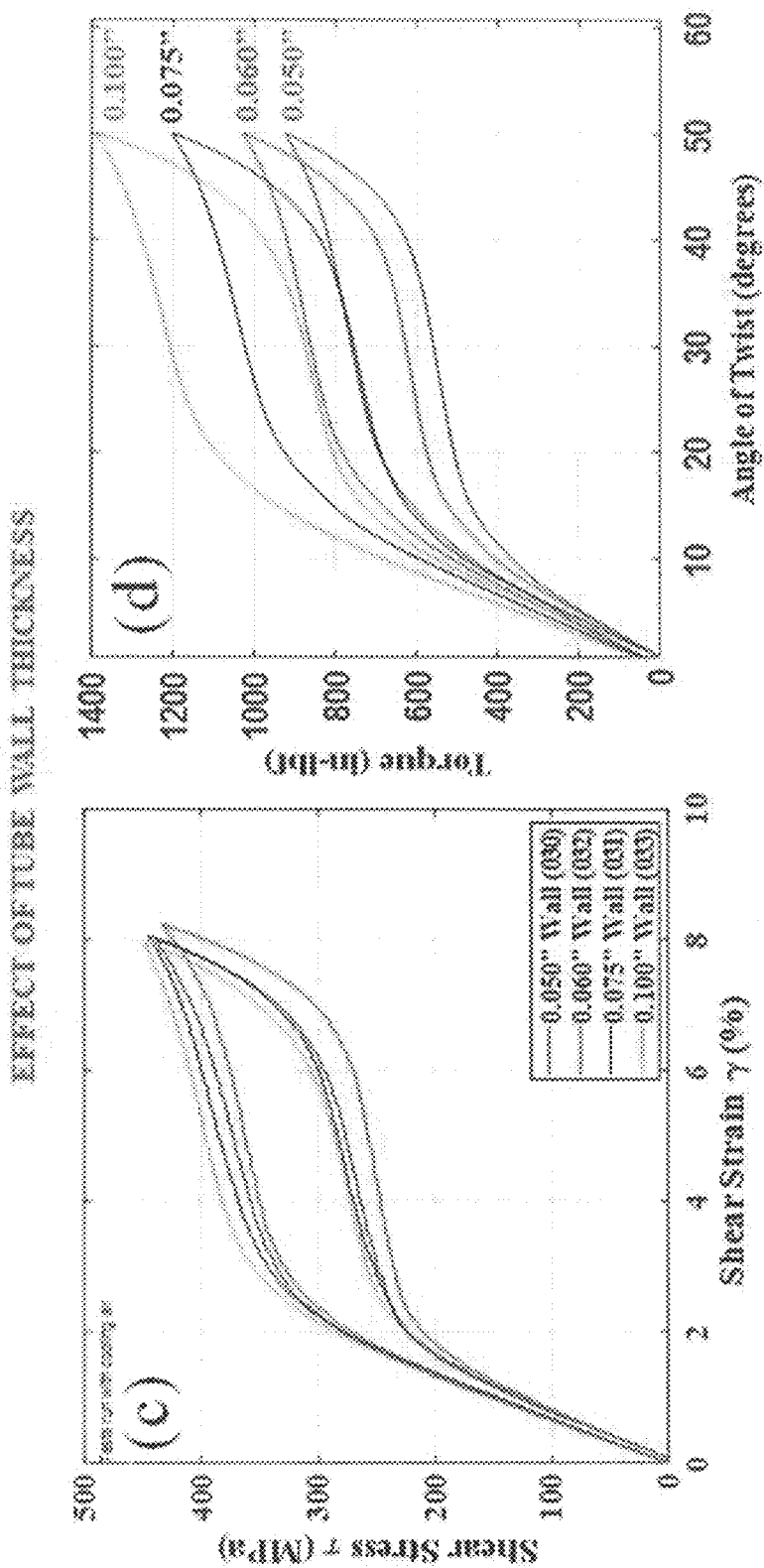
Figure 9E:
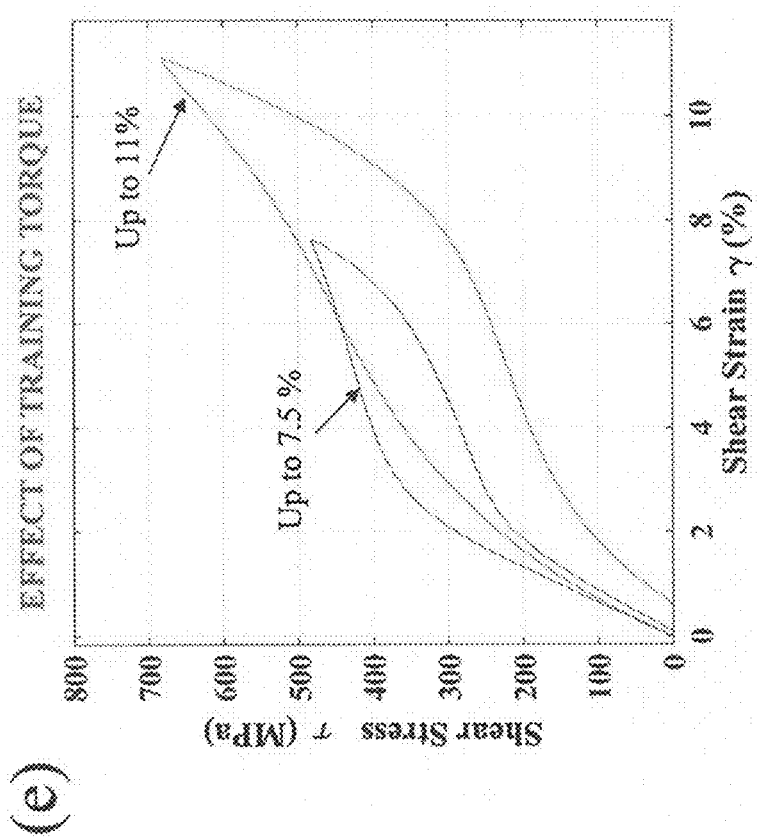

FIGS. 9C and 9D present an embodiment showing effects of tube wall thickness in relation between shear stress and shear strain as well as torque and angle of twist. It is to be appreciated that although a major difference may not be observed in Shear Stress to Shear Strain evaluations under variable wall thickness, conjugate torque capability (torque versus angle of twist) may be strongly impacted. It is to be further appreciated that a higher torque capability may be generated from a thicker wall tube. FIG. 9E presents a data trend showing that different loading magnitudes may yield varying responses.

Turning to FIGS. 10A-10D, example data trends for training effects of SMA material according to aspects of the innovation are illustrated. In this embodiment, an SMT comprising SMA material type of thermally reactive material (for example, outer tube 102 of SMT 100) has been tested using a thermomechanical cycling method to show a training response as to stability. For ease of discussion in context here, it is to be appreciated that the use of "SMT" may be used in relation to a single tube, while elsewhere the term "SMT" may be used for a set of tubes.

Figures 10A, 10B:
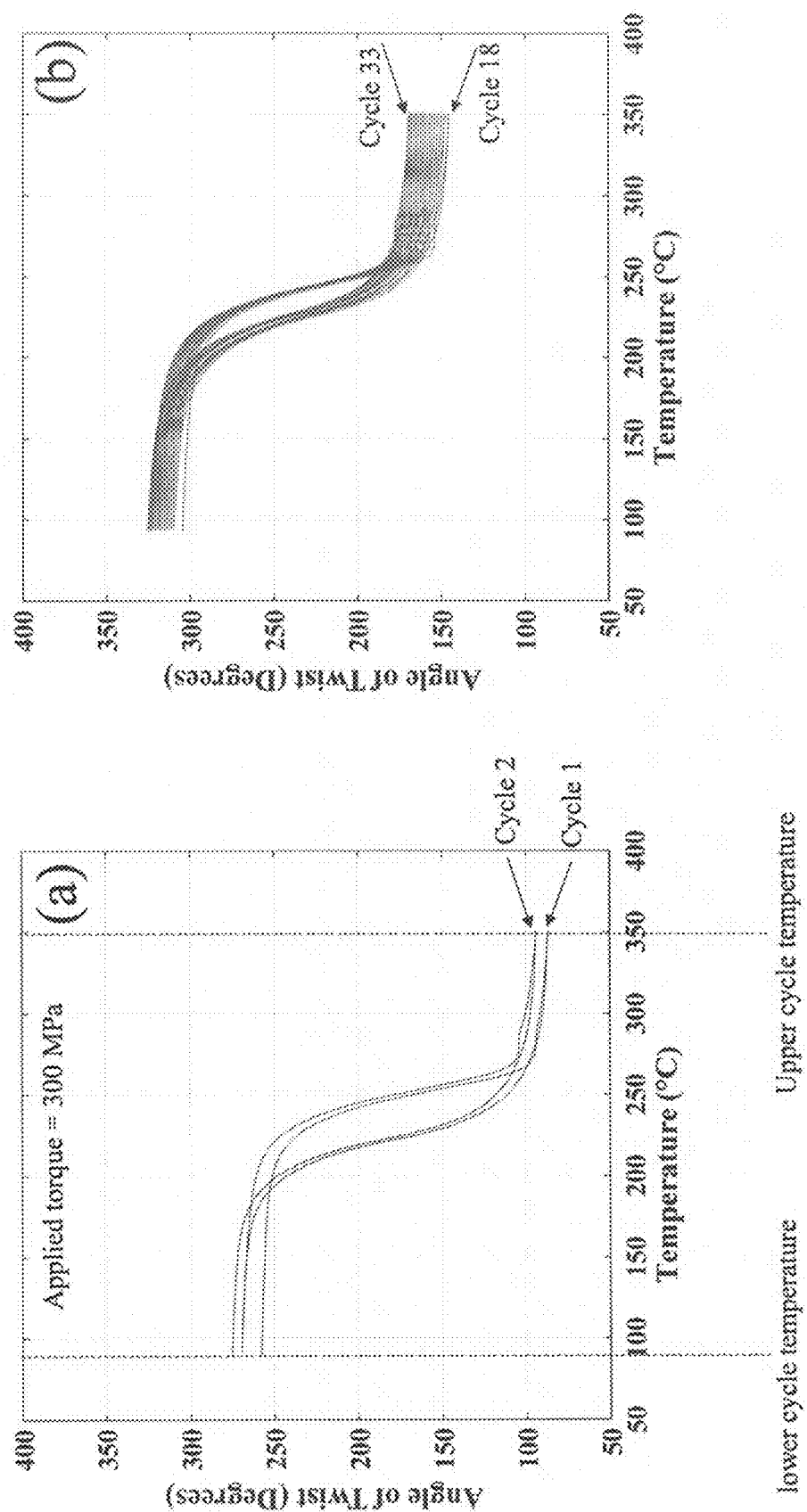
FIGS. 10A-10D illustrate example data trends for training effects of thermally responsive SMA material according to aspects of the innovation.
Figures 10C, 10D:
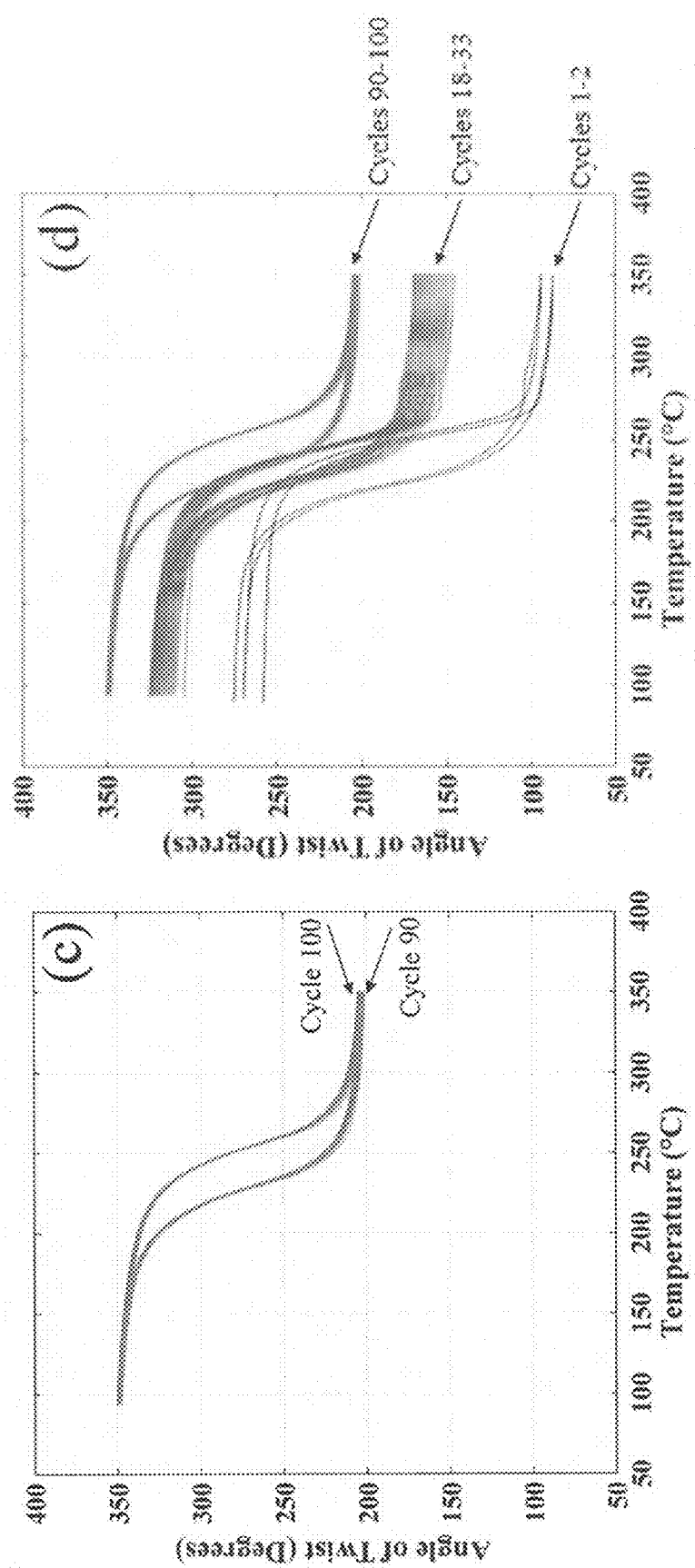

In FIG. 10A, classical hysteresis loops for cycles 1 and 2 are shown to not overlap, indicating an untrained (or unstable) SMT. It is to be appreciated that dimensional instability is present both at the lower and upper cycle temperatures. FIG. 10B presents results of additional thermal cycling, indicating a small change from cycle to cycle but still not fully stable (and likely not meeting a less restrictive "range" criteria for stability). FIG. 10C presents results of additional thermal cycles up to 100, revealing a much smaller angle change from cycle 90 to 100, and it is to be appreciated that this level of cycling may present a SMT that may be considered to meet criterion for stabilization. FIG. 10D provides a compilation of FIGS. 10A-10C, noting the upward translation of the curve after cycling. This affect may also be known as angle/strain evolution.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An element for a rotary actuator, comprising
a plurality of nested tubes comprising Shape Memory Alloy (SMA) material, and
a controller configured to modulate heating and cooling of the plurality of nested tubes;
wherein the controller is coupled to the plurality of nested tubes and configured to train the plurality of nested tubes to provide a mode of operation during a thermal cycling of the rotary actuator, and wherein the training comprises:
  for a minimum of two cycles, cycle a tube of the plurality of nested tubes by:
    applying a level of torque that exceeds a recoverable angle range of the material in the material's martensite phase,
    removing the level of torque,
    applying a second level of torque to exceed a maximum expected operational torque,
    holding the applied second level of torque for a predetermined amount of time,
    heating the tube to an upper cycle temperature,
    cooling the tube to a lower cycle temperature;
      wherein an angle output measurement is made at predetermined points throughout the cycle; and
    determine if the angle output is stable over the at least two cycles;

wherein a determination of stable indicates an end of the method and wherein a determination of not stable dictates that the cycle is repeated.

2. The element of claim 1, wherein the mode of operation during the thermal cycling is a multiplier mode.

3. The element of claim 2, wherein the multiplier mode is a multiplier of torque provided by the element to the rotary actuator during the thermal cycling.

4. The element of claim 2, wherein the multiplier mode is a multiplier of angular displacement provided by the element to the rotary actuator during the thermal cycling.

5. The element of claim 2, wherein the multiplier mode is a combination of a multiplier of angular displacement and a multiplier of torque provided by the element to the rotary actuator during the thermal cycling.

6. The element of claim 1, wherein the mode of operation during the thermal cycling is an output torque direction reversal.

7. The element of claim 1, wherein the mode of operation during the thermal cycling is a bias load mode provided by an inner nested tube that assists in a returning of an outer nested tube to its starting point at a beginning of the thermal cycle.

8. The element of claim 7, wherein the SMA material of the inner nested tube is of a force responsive type, and the SMA material of the outer nested tube is of a thermally responsive type.

9. The element of claim 7, wherein the SMA material of the inner nested tube is of a thermally responsive type, and the SMA material of the outer nested tube is of a force responsive type.

10. A method of training a tube comprising Shape Memory Alloy (SMA) material of a thermally responsive type, comprising:

for a minimum of two cycles, cycle the tube by:
applying a level of torque that exceeds a recoverable angle range of the material in the material's martensite phase,
removing the level of torque,
applying a second level of torque to exceed a maximum expected operational torque,
holding the applied second level of torque for a predetermined amount of time,
heating the tube to an upper cycle temperature,
cooling the tube to a lower cycle temperature;
wherein an angle output measurement is made at predetermined points throughout the cycle; and
determine if the angle output is stable over the at least two cycles;
wherein a determination of stable indicates an end of the method and wherein a determination of not stable dictates that the cycle is repeated.

11. The method of claim 10, wherein the determination of stable is based on a percentage dimensional change from cycle to cycle.

12. The method of claim 10, further comprising:
training the tube for a two-way effect,
wherein the training for two-way effect comprises:
for a minimum of two cycles of a second type of cycle,
apply the second type of cycle to the tube by:
applying a thermal cycle that comprises:
a heating portion wherein the tube is heated to an upper cycle temperature,
a cooling portion wherein the tube is cooled to a lower cycle temperature;
measuring a second angle output for each of the heating and cooling portions,
wherein a second angle output measurement is made at predetermined points throughout the second type of cycle; and
determine if the angle output is stable for a two-way effect over the at least two cycles of the second type of cycle;
wherein a determination of stable for a two-way effect indicates an end of the method and wherein a determination of not stable for a two-way effect dictates that the second type of cycle is repeated.

13. The method of claim 12, wherein the determination of stable for a two-way effect is based on a percentage dimensional change from second type of cycle to second type of cycle.

14. A method of providing rotary actuation for a rotary actuator system that comprises a plurality of nested tubes comprising Shape Memory Alloy (SMA) material, wherein the plurality of nested tubes are trained, the method comprising:

employing a thermal cycle to the plurality of nested tubes to affect at least one of a plurality of modes of operation,
wherein the plurality of modes of operation are at least one of:
a multiplier mode that comprises one of
a multiplier of torque provided by the plurality of nested tubes,
a multiplier of angular displacement provided by the plurality of nested tubes, and
a combination of the multiplier of angular displacement and of the multiplier of torque, or
an output torque direction reversal mode, or
a bias load mode that is provided by an inner nested tube to assist in returning an outer nested tube to a starting point of the outer nested tube at a beginning of the thermal cycle;
employing the one of the plurality of modes of operation,
wherein the employment of one of the plurality of modes of operation result in the providing of the rotary actuation and a respective effect of the employed mode; and
wherein the training comprises:
for a minimum of two cycles, cycle a tube of the plurality of nested tubes by:
applying a level of torque that exceeds a recoverable angle range of the material in the material's martensite phase,
removing the level of torque,
applying a second level of torque to exceed a maximum expected operational torque,
holding the applied second level of torque for a predetermined amount of time,
heating the tube to an upper cycle temperature,
cooling the tube to a lower cycle temperature;
wherein an angle output measurement is made at predetermined points throughout the cycle; and
determine if the angle output is stable over the at least two cycles;
wherein a determination of stable indicates an end of the method and wherein a determination of not stable dictates that the cycle is repeated.

15. The method of claim 14,
wherein for the multiplier mode, the SMA material of both an inner tube and an outer tube of the plurality of nested tubes comprises a thermally responsive SMA material.

16. The method of claim 14,
wherein for the output torque direction reversal mode, the SMA material of both the inner tube and the outer tube of the nested tubes comprises a thermally responsive SMA material.

17. The method of claim 14,
wherein for the bias load mode, the inner tube SMA material comprises a force responsive SMA material and the outer tube SMA material comprises a thermally responsive SMA material.

18. The method of claim 14,
wherein for the bias load mode, the inner tube SMA material comprises a thermally responsive SMA material and the outer tube SMA material comprises a force SMA material.

19. The element of claim 1, wherein at least one tube comprises superelastic properties such that when twisted the at least one tube undergoes a phase transition yielding a change in stiffness modulus against a large deformation of a twist wherein such large deformation can be entirely reversible upon load removal with magnitudes in the order of 10% shear strain.

\* \* \* \* \*